Oct. 11, 1960 A. B. WALKER 2,955,606
GENERAL PURPOSE INFLATABLE SHELTER
Filed April 30, 1956 4 Sheets-Sheet 1
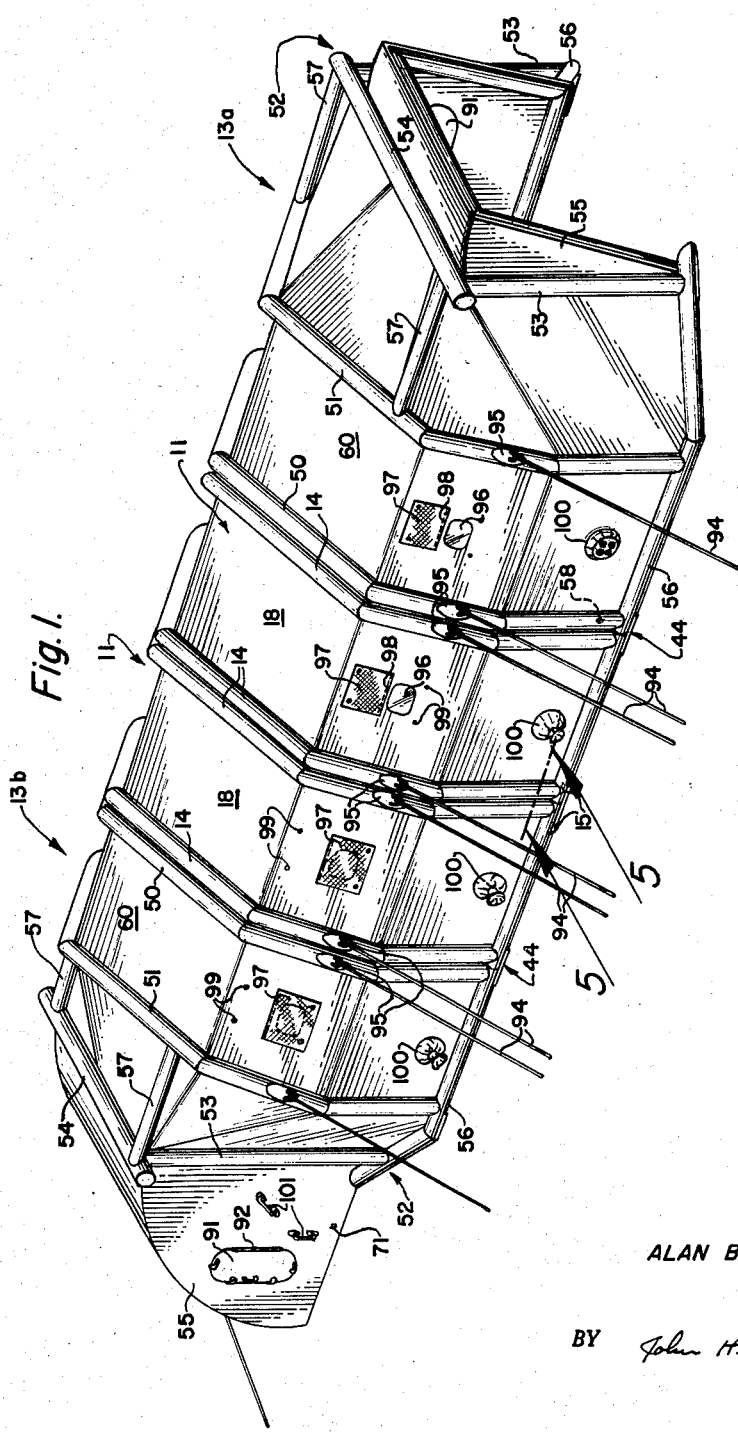
ALAN B. WALKER,
INVENTOR.
BY John H.J. Wallace

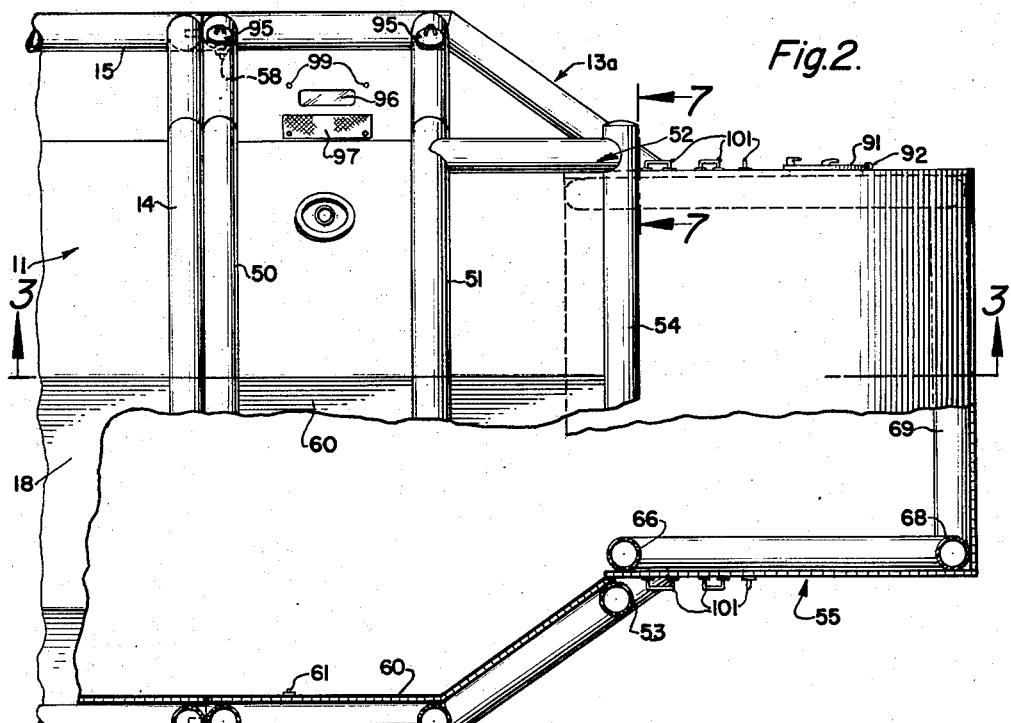
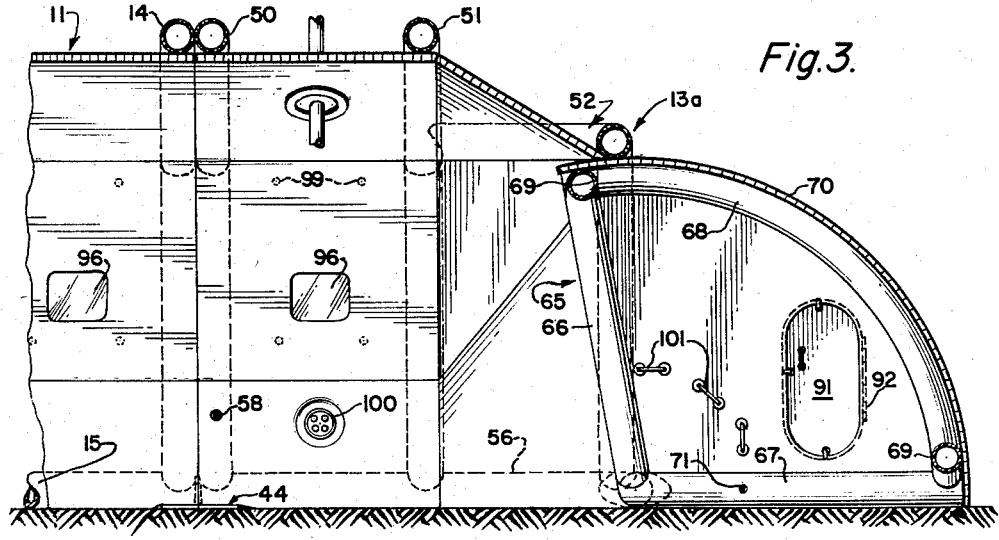

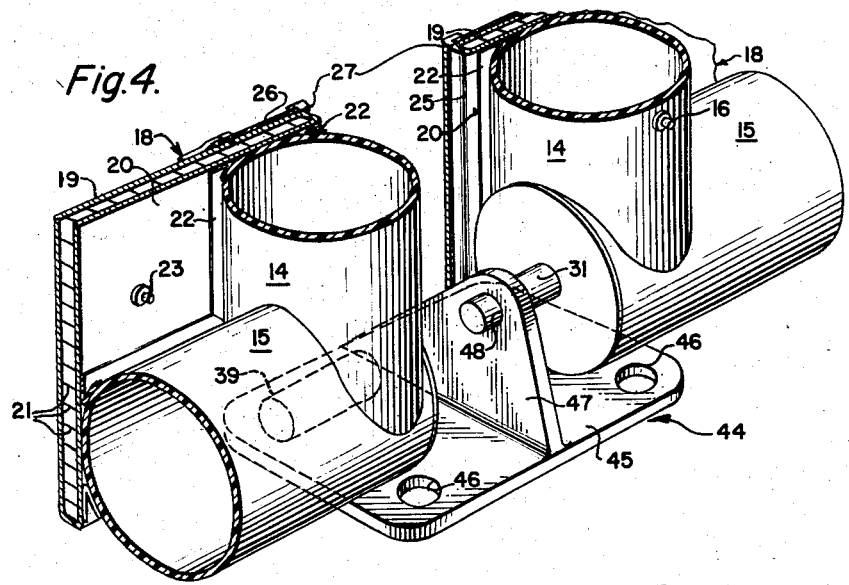
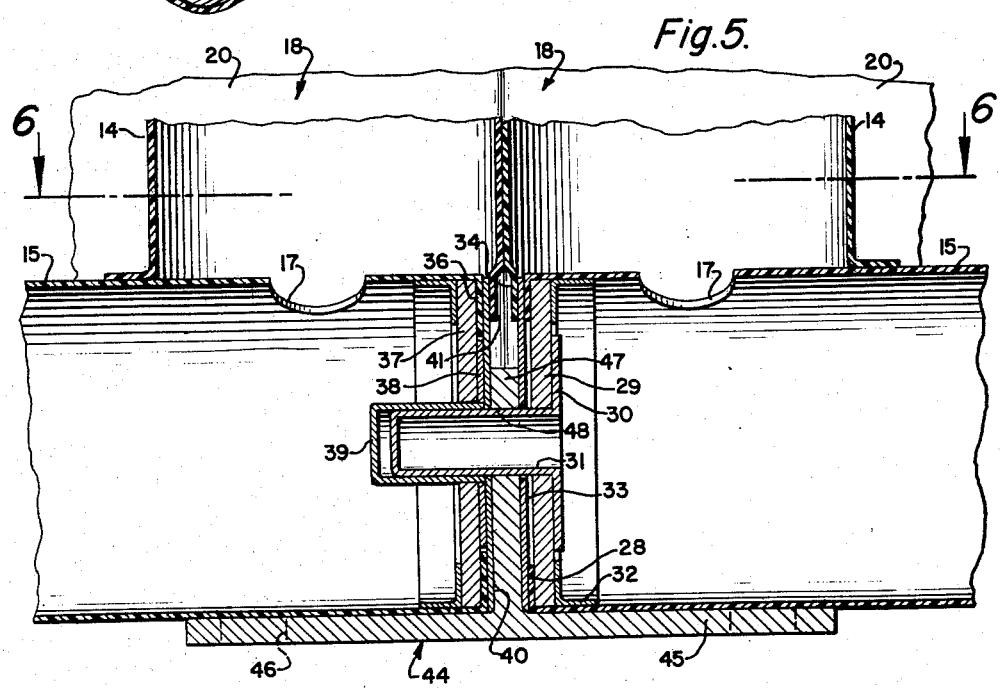

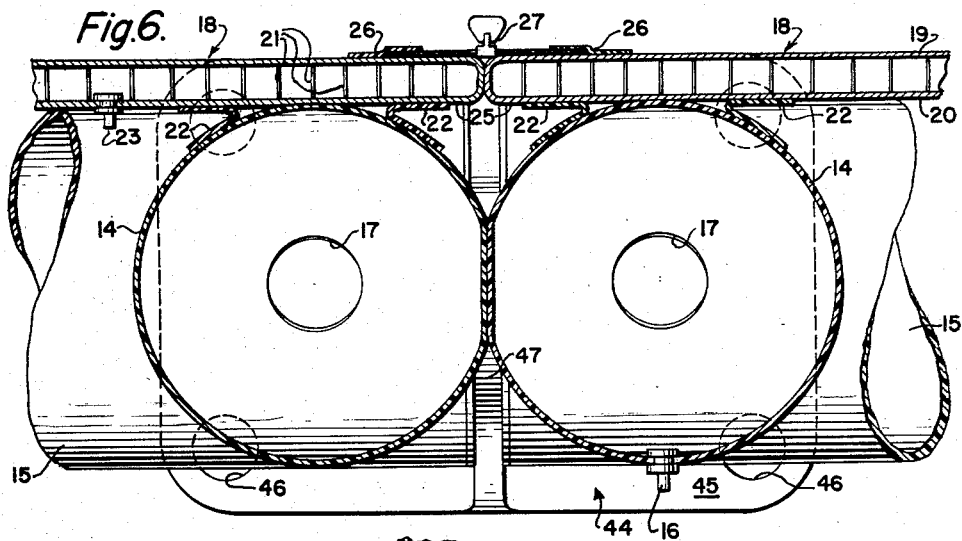
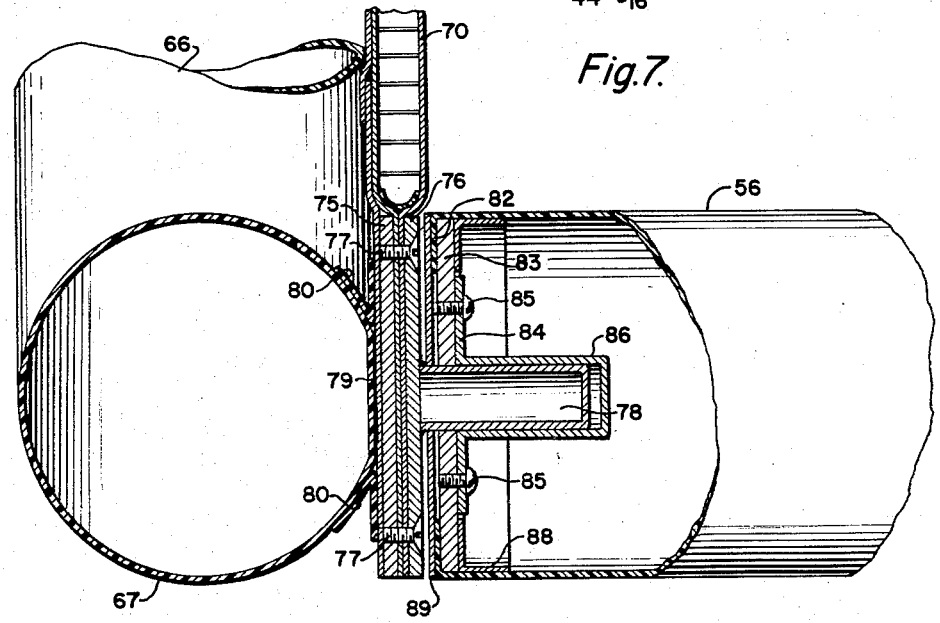

United States Patent Office 2,955,606
Patented Oct. 11, 1960

2,955,606
GENERAL PURPOSE INFLATABLE SHELTER

Alan B. Walker, Bound Brook, N.J., assignor to The Garrett Corporation, Los Angeles, Calif., a corporation of California Filed Apr. 30, 1956, Ser. No. 581,731
5 Claims. (Cl. 135—1)

This invention relates to an inflatable structure that may be utilized for a variety of uses, such as an administrative building, a hospital, or a vehicle repair shop. While the present structure is adapted for use in any climate, it provides exceptional protection against extremely hot or cold weather, such as may be found in the arctic regions or in deserts, and, therefore, is especially adapted for use in these regions.

The prior inflatable structures utilized for such purposes have not been satisfactory. These structures must necessarily be large, and the prior structures have been bulky to transport and difficult to erect. Large tents have been unsatisfactory due to the supporting poles required within the structure and the lack of adequate protection from the outside atmosphere. Prior shelters of the unitary type that were inflated by pumping air into the entire interior of the structure, provided a long clear span within the shelter, but were objectionable because of the large volume of air and the considerable time required to inflate the structure. Furthermore, to keep such a unitary structure erect, it was necessary to maintain the pressure inside the structure slightly above the ambient atmospheric pressure at all times, and such air locks as were provided for passage between the inside and outside of the structure were necessarily small and incapable of accommodating large objects, such as a motor vehicle. Other types of prior structures could be provided with large doors and passageways, but were objectionable because it was impossible to pass an object into, or out of, the structure without allowing free passage of air between the inside and outside of the structure while the door was in the fully open position.

It is an object of the present invention to provide an inflatable shelter that overcomes the foregoing and other disadvantages of the prior structures.

It is a further object of the invention to provide an improved inflatable structure having lightweight, individually inflatable sections that are easy to transport and erect and are self-supporting when inflated, and to provide a simple, reliable means for attaching adjacent sections of the structure to one another.

It is a still further object of the invention to provide an inflatable structure having lightweight, individually inflatable sections comprising an inflatable framework for supporting the section and separably inflatable insulating walls that contribute to the structural support when inflated.

It is another object of the invention to provide an inflatable structure having an inflatable door of sufficient size to accommodate a large object, such as a motor vehicle, the door being arranged to prevent passage of air between the inside and outside of the structure when in the fully open, or fully closed, position.

It is still another object of the invention to provide an inflatable structure having an inflatable door of the above described type that, when in the fully closed position, provides the end of the structure with a desirable aerodynamic form to resist wind loads as well as preventing passage of air between the inside and outside of the structure.

It is still another object of the invention to provide simple means for maintaining the shape of the structure and for anchoring it in a selected location.

Other and further important objects of the present invention will become apparent from the disclosures in the following detailed specification, appended claims, and accompanying drawings, wherein:

Fig. 1 is a perspective view of a structure embodying the invention, showing the door at one end in the fully closed position and the door at the other end in the fully open position;

Fig. 2 is an enlarged plan view of an end of the structure showing the door in the fully closed position, parts being broken away for the purpose of illustration;

Fig. 3 is a sectional view taken along line 3—3 of Fig. 2;

Fig. 4 is a perspective view to a still larger scale showing the manner of assembling adjacent panels at an anchor;

Fig. 5 is an enlarged vertical sectional view through the anchor assemblage taken on line 5—5 of Fig. 1;

Fig. 6 is an enlarged sectional view taken on line 6—6 of Fig. 5; and

Fig. 7 is an enlarged vertical sectional view through the pivotal mounting for the door taken on line 7—7 of Fig. 2.

As shown in Fig. 1, the shelter has a central portion, formed of individually inflatable center sections or panels 11, and end portions closing the front and rear ends of the shelter formed of individually inflatable end panel 13a or 13b. Each center section 11 and each end section 13a or 13b constitutes, in the inflated condition, a self-supporting, individual sectional unit of the shelter. Any number of center sections 11 may be used in the shelter, the number being determined by the length of the shelter desired.

Each center section or panel 11 has an inflatable supporting structural framework comprising a pair of longitudinally spaced inflatable structural bows or arches 14 connected at the lower end on each side of the panel to a longitudinally extending inflatable ground beam 15. An inflation valve 16 is provided in one of the bows 14 for inflating the bows 14 and the beams 15 comprising the supporting framework. An opening 17 is provided in the beam 15 at each of its junctions with the bows 14 for permitting free flow of air between the bows and the beam.

As best seen in Figs. 4 and 6, a two-ply, air-tight, inflatable fabric insulating wall 18, comprised of a first-ply 19 and a second-ply 20 interconnected by a multiplicity of tie threads 21 of predetermined length of span therebetween, is connected to the inner surface of the bows 14 and the beam 15. Crotch tape 22 is applied to the bow 14 and the wall 18 to reinforce the connection. An inflation valve 23 is provided for separately inflating the insulating wall 18.

A portion 25 of the insulating wall 18 extends beyond the connection with the bows 14 and is provided with a means 26 suitable for engaging a slide fastener 27. The portion 25 is of such length that when, in erecting the shelter, adjacent panels are brought together and are joined by the slide fastener 27, the bows 14 of the adjacent panels, when inflated, will jam against each other and entrap air in the space between the bows and the portions 25, and thus contribute to the thermally insulating properties of the joint.

At each side of the panel 11 a portion 28 at one end of the beam 15 is folded over and secured to a reinforcing disc 29 which supports a plate 30 having a pin 31 mounted thereon, the pin projecting through and extending beyond the disc 29. A stiffener angle 32, a plate 33 and the overlapping end 34 of the bow 14 serve to reinforce and stiffen the attachment. At the other end of the beam 15 at each side of the panel, a portion 36 is folded over and secured to a reinforcing disc 37 which supports a plate 38 having a socket 39 mounted thereon. A plate 40 and the overlapping end 41 of the bow 14 serve to reinforce and stiffen the attachment. The pins 31 and the sockets 39 are coaxially aligned so that the sockets 39 of one panel will receive the pins 31 of an adjacent panel. An anchor 44 comprising a base plate 45 having a plurality of holes 46 and an upstanding plate 47 having a hole 48 adapted to receive the pin 31 is provided to be positioned between adjacent panels and secured to the ground by stakes (not shown) driven through the holes 46.

Each end panel 13a and 13b has an inflatable supporting structural framework which includes an inflatable bow 50, identical to bow 14. At the end of the panel abutting the adjacent panel 11 of the center section, a similar bow 51 spaced intermediate the panel, and an inflatable structural door frame 52 at the free end of the panel comprising a pair of spaced vertical beams 53 and a transversely extending beam 54. The structural frame 52 is adapted to frictionally engage an inflatable door 55 pivotally mounted on the supporting framework in the manner hereinafter described. The bow 50, the bow 51, and the vertical beams 53 are connected to, and intercommunicate with, a longitudinally extending inflatable ground beam 56 on each side of the panel. A pair of spaced longitudinally extending inflatable beams 57 disposed between, and intercommunicating with, the bow 51 and the beam 54 on each side of the panel are provided to supply stability to the door frame 52. An inflation valve 58 in the bow 50 is provided for inflating the bow 50, the bow 51, the beams 57, the frame 52, and the beam 56 of the supporting framework. A two-ply, air-tight, inflatable fabric insulating wall 60, identical in construction to the wall 18, spans the spaces between, and is connected to, the aforementioned members of the supporting framework. An inflation valve 61 is provided for separately inflating the insulating wall 60.

A portion of the insulating wall 60, similar to the portion 25 of the insulating wall 18, extends beyond the connection with the bow 50 and is provided with means similar to means 26 on the portion 25, to engage the slide fastener 27. The connection of the insulating wall 60 of an end panel 13a or 13b to the insulating wall 18 of a panel 11 of the center section is identical in detail to the connection of the insulating walls 18 of two adjacent panels 11.

The panels 13a and 13b are identical except that in panel 13a pins 31 are attached to the end of the beam 56 adjacent the center panel 11 in the manner described above for beam 15, whereas in panel 13b sockets 39 are attached to the end of the beam 56 adjacent the center panel 11 in the manner described above for beam 15. Thus, the pins 31 on panel 13a will fit into the sockets of the adjacent center panel 11, and the sockets 39 on panel 13b will receive the pins of the adjacent center panel 11.

The inflatable door 55 is of sufficient size to allow a large object, such as a motor vehicle, to be moved in an out of the structure. The door has a pair of spaced inflatable structural frames 65 comprising a beam 66 and a beam 67 disposed at an angle to each other and joined at their outer ends by a uniformly curved inflatable beam 68. The axis of curvature of the beam 68 is the axis about which the door 55 revolves in moving from one position to another. A pair of spaced transversely extending inflatable beams 69 disposed between, and intercommunicating with, the beams 68 adjacent each end are provided to supply stability to the frames 65.

A two-ply, air-tight, inflatable fabric insulating cover 70, identical in construction to the wall 18, is placed on, and fastened to, the frames 65 and the beams 69 to form a curved top and sectoral shaped sides for the door. A single inflation valve 71 may be provided for inflating the frames 65, the beams 69 and the cover 70, or two separate inflation valves may be provided, one for supporting framework and one for the cover.

The cover and structural members of the door are of such size that, when inflated, the cover 70 will frictionally engage the beams 53 and 54 of the door frame 52 at all times, to prevent seepage of air between the frame and the door. The length of the curved beam 68 and the superimposed cover 70 is such that when the door 55 is in the fully open or fully closed position, one end of the cover 70 engages the ground, or the floor of the structure, while the other end of the cover still projects or extends beyond the beams 53 and 54. Thus, passage of air between the inside and outside of the structure is prevented when the door is in the fully open or fully closed position. When the door 55 is in the fully closed position, the curved upper surface of the cover 70 provides the end of the structure with an aerodynamic form which will resist wind loads.

As shown in Fig. 7, a portion of the cover 70 on each side of the door adjacent the extremity of the longitudinally extending beam 56 is sandwiched between and cemented to a backing plate 75 and a hinge plate 76, the plates being secured together by screws 77. A hinge pin 78 is fixedly mounted on the hinge plate 76. The backing plate 75 is covered with a fabric 79 and then crotch mounted with the help of crotch angles 80, to the frame 65 at the junction of the beams 66 and 67.

At the end of the beam 56 at each side of the panel adjacent the door 55 a portion 82 is folded over and secured to a reinforcing disc 83. A plate 84 attached to the reinforcing disc 83 by screws 85 fixedly supports a socket 86 adapted to receive the pin 78 to form a pivotal hinge on which the door 55 may be rotated from a fully open to a fully closed position. A stiffener angle 88 and a plate 89 serve to stiffen the attachment.

A small door 91 for entry or exit of personnel is attached to the inflatable door 55 by a hinge 92. The door 91 may be made of inflatable material and may be latched in any of the ways well known to the art.

A plurality of handles 101 made of flexible material are secured to the inner and outer surface of the doors to assist in moving the door from one position to another.

When collapsed, the individual center panels and end panels may be rolled up into light compact bundles, or folded in any desired manner into lightweight packages, for ease of transportation. When erecting the structure, the anchors 44 are positioned in the selected location and secured to the ground. In addition to anchoring the structure to the ground, the anchors 44, by engaging pin 31 in the hole 48, contribute to the maintenance of the shape of the structure by preventing the inflatable supporting framework of the panels from spreading apart.

The structure may be inflated with a gas, such as $CO_2$, or air. Each section or panel of the structure is inflated separately after it has been joined to the anchor plate and fastened to the adjacent panel. The bows and beams forming the supporting framework carry the main structural loads and are inflated first, thus allowing the structure to stand and provide protection against wind, snow, or rain while the insulating walls are being inflated. The insulating walls, when inflated, contribute to the structural support of the panels as well as provide insulation.

To increase the stability of the structure, it is secured to the ground at a plurality of points by guys 94 attached at one end to patches 95 affixed on bows 14, 15, and 51, and secured at the other end to ground stakes (not shown).

The structure may be additionally squipped with a plurality of windows 96 provided with protective covers 97 attached to the insulating wall at 98 and fastened into open or closed position by snap fasteners 99. It may also be provided with one or more ventilators 100 of any type well known to the art, and various duct or stack openings (not shown).

I claim:

1. An inflatable structure, comprising: individually inflatable center panels having an inflatable supporting framework; individually inflatable end panels forming closed front and rear ends for said structure, said inflatable end panels having an inflatable supporting framework and a separately inflatable door; an individual separably inflatable insulating wall for each panel connected to the supporting framework of each center and end panel; slide fastener means for joining the insulating walls of adjacent panels to form a continuous space enclosing chamber structure; pin means extending between the frameworks of adjacent panels; means on the frameworks of adjacent panels cooperating with said pin means to retain said pin means against displacement from between such frameworks and position adjacent panels generally co-planar at their adjoining ends; anchor means for securing the structure in the preselected location and for preventing the inflatable frameworks of the panels from spreading apart, said anchor means having a base portion provided with a surface securable to the ground and an upstanding portion to extend between adjacent panels, said upstanding portion where it extends between adjacent panels engaging said pin means to anchor the panels.

2. An inflatable structure, comprising: individually inflatable center panels having an inflatable supporting framework; individually inflatable end panels forming closed front and rear ends for said structure, said inflatable end panels having an inflatable supporting framework, including an inflatable door frame, and a separately inflatable door pivotally mounted on the supporting framework; an individual separately inflatable insulating wall for each panel connected to the supporting framework of each center and end panel; slide fastener means for joining the insulating walls of adjacent panels to form a continuous space enclosing structure; pin means extending between the frameworks of adjacent panels; means on the frameworks of adjacent panels cooperating with said pin means to retain said pin means against displacement from between such frameworks and position adjacent panels generally co-planar at their adjoining ends; anchor means for securing the structure in the preselected location and for preventing the inflatable frameworks of the panels from spreading apart, said anchor means having a base portion provided with a surface securable to the ground and an upstanding portion to extend between adjacent panels, said upstanding portion where it extends between adjacent panels engaging said pin means to anchor the panels.

3. An inflatable structure, comprising: individually inflatable center panels having an inflatable supporting framework; individually inflatable end panels forming closed front and rear ends for said structure, said inflatable end panels having an inflatable supporting framework including an inflatable door frame; a separately inflatable door for each end panel pivotally mounted on the supporting framework of said front and rear end panels respectively, each said door having walls defining a door chamber for receiving the item to be entered into or removed from said structure and adapted to rotate in the door frame between a first outwardly projecting position with said door chamber opening inwardly and a second inwardly projecting position with said door chamber opening outwardly, the door having a curved upper surface and sectoral shaped sides for preventing passage of air between the inside and outside of the structure when the door is in the first or second position, the curved upper surface providing the end of the structure with a streamlined form for resisting wind loads when the door is in the second position; an individual separably inflatable insulating wall for each center and end panel connected to the supporting framework of the panel; slide fastener means for joining the insulating walls of adjacent panels to form a continuous structure; and anchor means for securing the structure in the preselected location and for preventing the inflatable framework of the panels from spreading apart.

4. An inflatable structure, comprising: individually inflatable center panels having an inflatable supporting framework; individually inflatable end panels forming closed front and rear ends for said structure, said inflatable end panels having an inflatable supporting framework including an inflatable door frame; a separately inflatable door for each end panel pivotally mounted on the supporting framework of said front and rear end panels respectively, each said door having walls defining a door chamber for receiving the item to be entered into or removed from said structure and adapted to rotate in the door frame between a first outwardly projecting position with said door chamber opening inwardly and a second inwardly projecting position with said door chamber opening outwardly, the door comprising an inflatable supporting framework and an inflatable cover formed to prevent passage of air between the inside and outside of the structure when the door is in the first or second position and to provide the end of the structure with a streamlined form for resisting wind loads when the door is in the second position; an individual separably inflatable insulating wall for each center and end panel connected to the supporting framework of the panel; slide fastener means for joining the insulating walls of adjacent panels to form a continuous structure; and anchor means for securing the structure in the preselected location and for preventing the inflatable framework of the panels from spreading apart.

5. An inflatable structure, comprising: a plurality of individually inflatable panels for forming a continuous space enclosing chamber structure and including end panels forming closed front and rear ends for said structure; fastener means for joining adjacent panels into said continuous space enclosing chamber structure; said inflatable end panels having an inflatable supporting framework including an inflatable doorframe; a separately inflatable door for each end panel having walls defining a door chamber for receiving the item to be entered into or removed from said structure, each said door being pivotally mounted on said supporting framework of one of said end panels to rotate in the doorframe from a first inwardly projecting position with said door chamber opening outwardly of said chamber structure to a second outwardly projecting position with said door chamber opening inwardly of said structure.

References Cited in the file of this patent

UNITED STATES PATENTS

| | | |
|---|---|---|
| 2,411,316 | Capita | Nov. 19, 1946 |
| 2,532,456 | Merritt | Dec. 5, 1950 |
| 2,591,829 | Katzenmeyer et al. | Apr. 8, 1952 |
| 2,610,366 | McKee et al. | Sept. 16, 1952 |
| 2,636,457 | Finlay et al. | Apr. 28, 1953 |
| 2,649,101 | Suits | Aug. 18, 1953 |
| 2,682,274 | Miller | June 29, 1954 |
| 2,698,020 | Phane | Dec. 28, 1954 |
| 2,752,928 | Barker | July 3, 1956 |
| 2,819,724 | Barker | Jan. 14, 1958 |

FOREIGN PATENTS

| | | |
|---|---|---|
| 132,134 | Great Britain | Sept. 11, 1919 |
| 201,327 | Australia | Dec. 15, 1955 |